United States Patent [19]

Steinkirchner et al.

[11] Patent Number: 5,295,202
[45] Date of Patent: Mar. 15, 1994

[54] METHOD AND APPARATUS FOR REPLICATING A TWO-COLOR ORIGINAL IMAGE WITH FOREGROUND AND BACKGROUND COLORS EXCHANGED

[75] Inventors: James J. Steinkirchner, Brockport; Lawrence B. Telle, Rochester, both of N.Y.

[73] Assignee: Eastman Kodak Company, Rochester, N.Y.

[21] Appl. No.: 747,171

[22] Filed: Aug. 19, 1991

[51] Int. Cl.$^5$ .......................... H04N 9/46; H04N 1/46
[52] U.S. Cl. ........................................ 382/51; 382/17; 358/530; 358/537
[58] Field of Search .............................. 382/51, 17, 18; 340/701; 358/448, 80, 530, 537

[56] References Cited

U.S. PATENT DOCUMENTS

| | | | |
|---|---|---|---|
| 3,745,527 | 7/1973 | Yoshimura et al. | 340/146.3 B |
| 4,433,345 | 2/1984 | Haddick et al. | 358/244 |
| 4,843,573 | 6/1989 | Taylor et al. | 364/521 |
| 4,878,178 | 10/1989 | Takakura et al. | 364/521 |
| 4,956,704 | 9/1990 | Yamada | 358/80 |
| 5,046,118 | 9/1991 | Ajewole et al. | 382/51 |
| 5,091,967 | 2/1992 | Ohsawa | 382/22 |

FOREIGN PATENT DOCUMENTS 0337325 10/1989 European Pat. Off. .
0441558 8/1991 European Pat. Off. .
63-307584 12/1988 Japan .

Primary Examiner—David K. Moore
Assistant Examiner—Andrew W. Johns
Attorney, Agent, or Firm—Norman Rushefsky

[57] ABSTRACT

Replication of a two-color original image with foreground and background colors exchanged is effected on a received signal representing the color information of each successive pixel of a two-color original image by generating a histogram of the color data distribution for each color plane of the original image, determining a translation point within each histogram, and performing a histogram translation of the color plane image data about the translation point. The translation point may be determined by selecting the approximate midpoint between the foreground information and the background information in each histogram as the translation point, or by selecting the statistical average of each histogram as the translation point. Once the translation point is determined, a new color data value for each pixel in a color plane is selected by subtracting the pixel's original color data value from twice the color data value of the translation point.

4 Claims, 6 Drawing Sheets

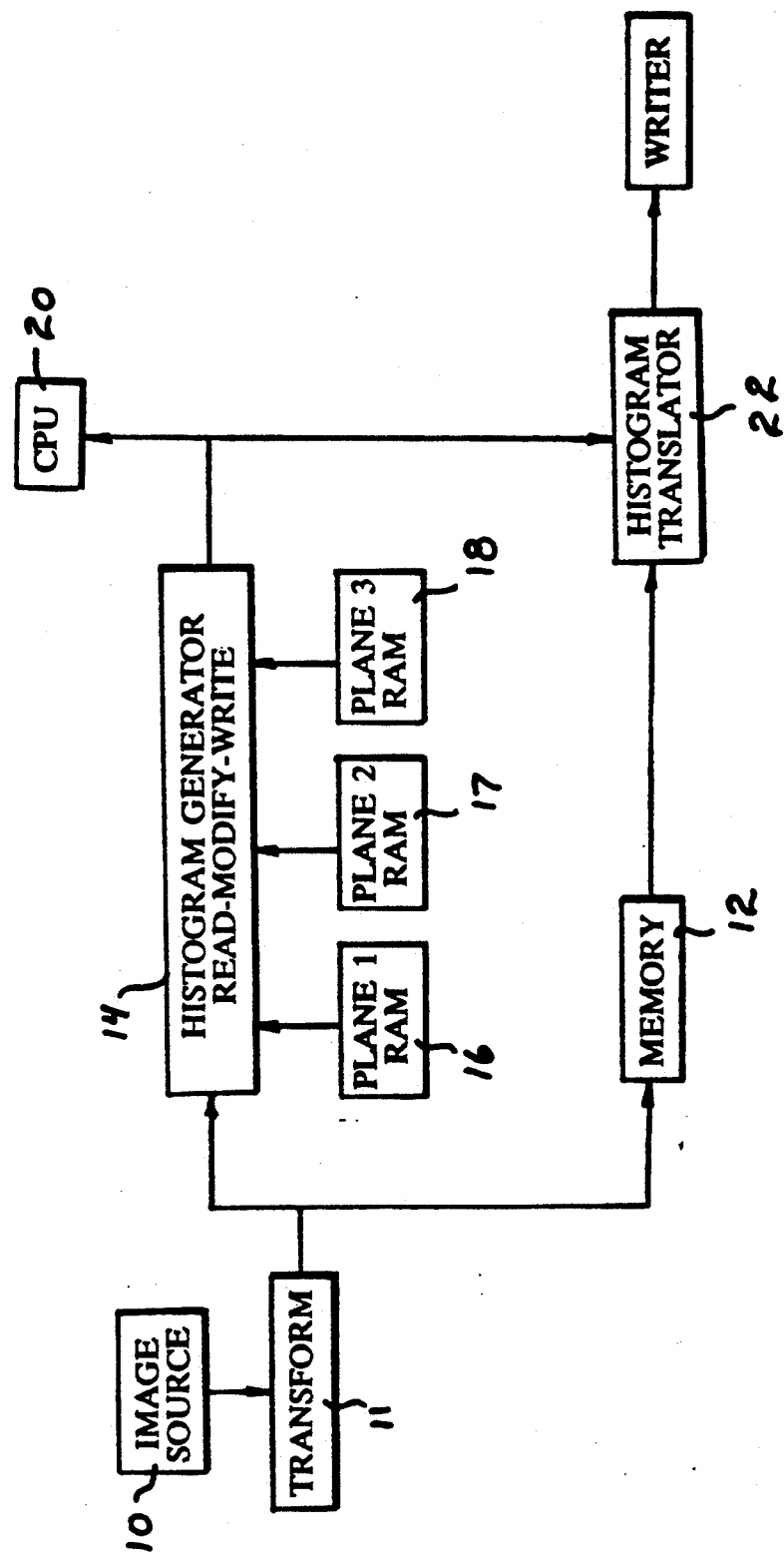

METHOD AND APPARATUS FOR REPLICATING A TWO-COLOR ORIGINAL IMAGE WITH FOREGROUND AND BACKGROUND COLORS EXCHANGED

BACKGROUND OF THE INVENTION

Technical Field

This invention relates generally to color image replication, and more particularly to exchanging the colors of the foreground and the background of a two-color image.

Background Art

Digital monochromatic copiers and printers are able to exchange the foreground and background portions of images by inverting the video signal. In a single-bit, two gray level system, this entails replacing ONEs that appear in the original binary image data with ZEROs and replacing original ZEROS with ONEs. In a two-bit, four gray level system, ZEROs would be replaced with THREEs, ONEs replaced with TWOs, TWOs replaced with ONEs, and THREES replaced with ZEROs. Similar procedures can be carried out for monochromatic systems with any number of gray levels. This process is commonly referred to as image reversal, and results in a "negative image" of the original.

Color image replication is commonly effected by separating the color information into tristimulus-value color planes represented in a three dimensional coordinate system. The three planes of the data stream specify the color of pixels of the original image in one of a plurality of known color spaces that describe the gamut of color. Widely used color spaces include the RGB color system (although this system does not provide perceptually uniform color space); the CIELUV color space characterized by $L^*$, $u^*$, and $v^*$ coordinate axes; and the CIELAB color space characterized by $L^*$, $a^*$, and $b^*$ coordinate axes.

Video inversion of such tristimulus-value color plane images would not result in the exchange of foreground and background information when the three color planes were recombined.

DISCLOSURE OF INVENTION

It is an object of the present invention to provide for the exchange of the foreground and the background colors of a two-color image.

According to a preferred embodiment of the present invention, replication of a two-color original image with foreground and background colors exchanged, is effected on a received signal representing the color information of each successive pixel of a two-color original image by generating a histogram of the color data distribution for each color plane of the original image, determining a translation point within each histogram, and performing a histogram translation of the color plane image data about the translation point. The translation point may be determined by selecting the approximate midpoint between the foreground information and the background information in each histogram as the translation point, or by selecting the statistical average of each histogram as the translation point. Once the translation point is determined, a new color data value for each pixel in a color plane may be selected by subtracting the pixel's original color data value from twice the color data value of the translation point.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a block diagram of a color image replication apparatus in accordance with a preferred embodiment of the present invention.

BEST MODE FOR CARRYING OUT THE INVENTION

FIG. 1 is an illustration of apparatus adapted to replicate color originals by means of an electronic digital data stream used to drive a writer. It will be understood that images to be replicated may exist on hard copy originals and be converted to electronic form by a scanner, or the images to be replicated may exist solely in electronic form, such as those images which are generated by computer.

An image source 10, such as a scanner, a computer, or a network, provides digital, tristimulus-value color plane image data which represents a color image in a three dimensional coordinate system such as the RGB color system mentioned above. The R, G, and B color data signals from image source 10 are linear measures of relative red, green, and blue reflectances of transmittances of each successive location (pixel) in a rasterized color document. The color data signals may represent other linear measures of the color image content of the original, such as for example, red, luminance, and blue information.

The color data signal provided by image source 10 may be converted to another three dimensional coordinate system as desired. In the preferred embodiment, nonlinear transformations are performed on the color data signal at 11 to generate three new color data signals in a coordinate system intended to represent color information in a color space which is, insofar as possible, linear with respect to human visual color tolerance errors.

The image signals for the three color planes are inputted to a memory 12, which stores the tristimulus-value color plane image color data for each pixel, i.e. the value of the color image content in each of the three color planes of the coordinate system being used for each pixel. Memory 12 comprises, for example, a static or dynamic random access memory or disk drive. The value of each pixel is represented by data bits. Eight data bits are required for distinguishing 256 different values.

Figure 2A:
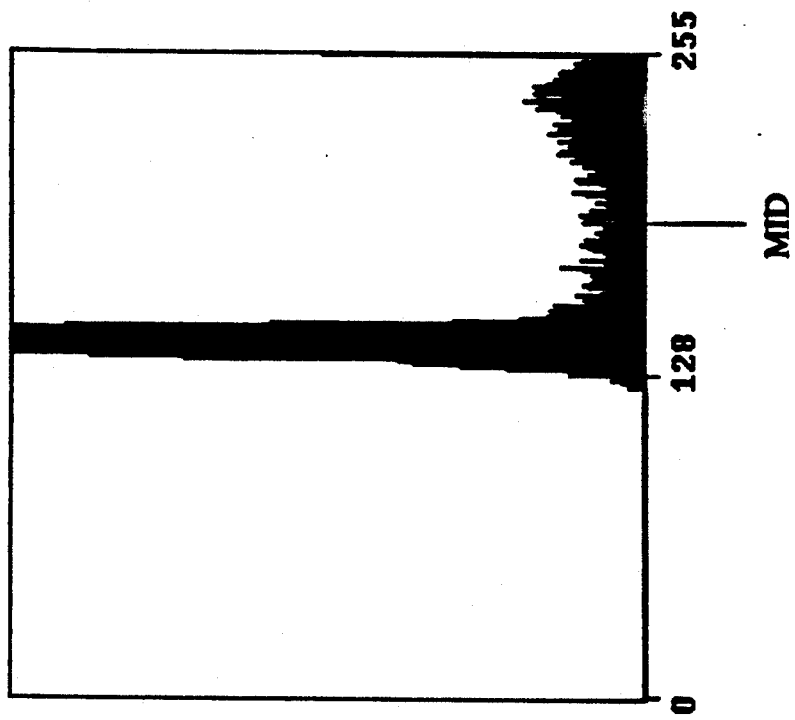
FIGS. 2A, 2B, and 2C are illustrations of typical histograms of tristimulus-value color planes of an image that may be replicated in accordance with the present invention.
Figure 2B:
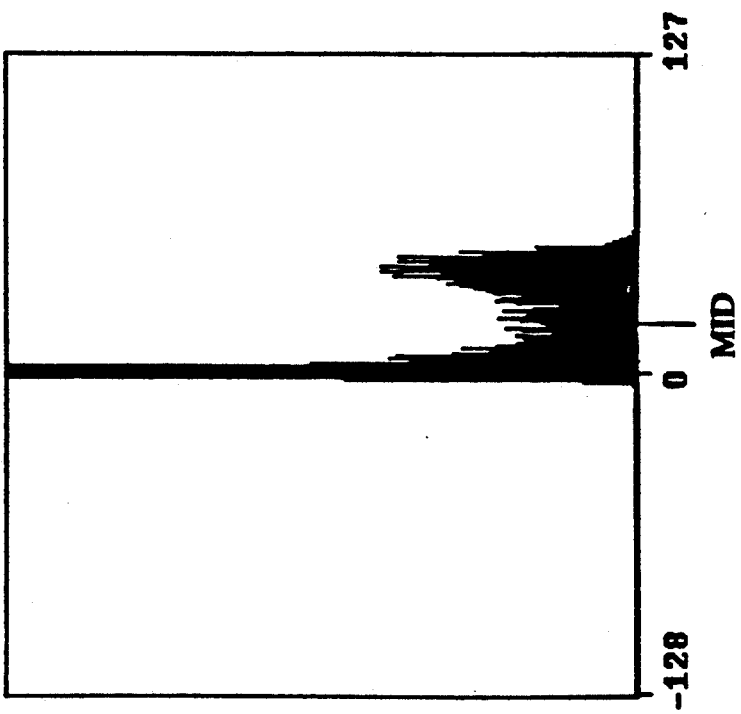
Figure 2C:
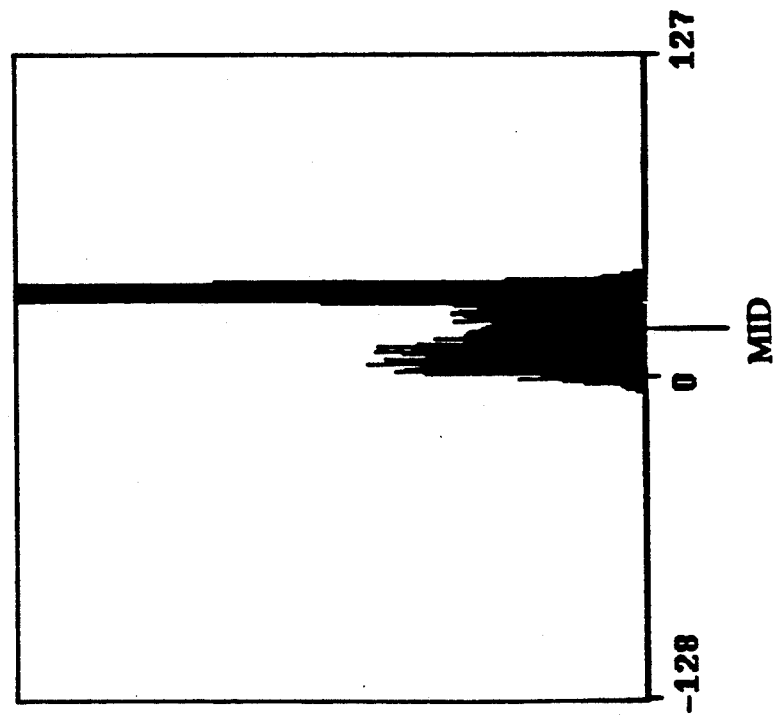

According to the invention, the first step in identifying the background and foreground values is to generate a histogram of each color plane by a histogram generator 14. Plots of a typical set of histograms of tristimulus-value color planes of an image that may be replicated in accordance with the present invention are shown in FIGS. 2A, 2B, and 2C, respectively.

These histogram plots illustrate the color data distribution (that is, the number of pixels at each color data value) along the vertical axis, as compared to their color data values 0 through 255 along the horizontal axis. There will generally be two peaks in the histograms; one being caused by the foreground pixels and the other by the background pixels. Usually, a higher- peak in the histogram will indicate the color data value of the background of the image, while the foreground will cause a lower peak. Of course, images that have more foreground pixels than background pixels will exhibit higher peaks in the histogram at the foreground value than at the background value. The position of the peaks will be determined by their relative values in each color plane.

Histogram generator 14 stores the histograms in three static RAMs 16, 17, and 18. The RAMs act as 256 n-bit counters for each tristimulus-value color plane. The 8-bit video value is used as an address to a location in the static RAM where a read-modify-write cycle is performed. The modify portion of the cycle consists of ADD ONE TO THE VALUE READ (the SRAM is initialized to zero before the histogram is created). This is performed on a plane-by-plane basis to create the histogram in real time, with the static RAM locations acting as counters.

A central processing unit 20 can read the three histograms and perform a software algorithm on the histogram data for each plane. The algorithm finds the value where the two peaks are located in the histograms, and calculates the value midway between the peaks for each of the three histograms.

Figure 3:
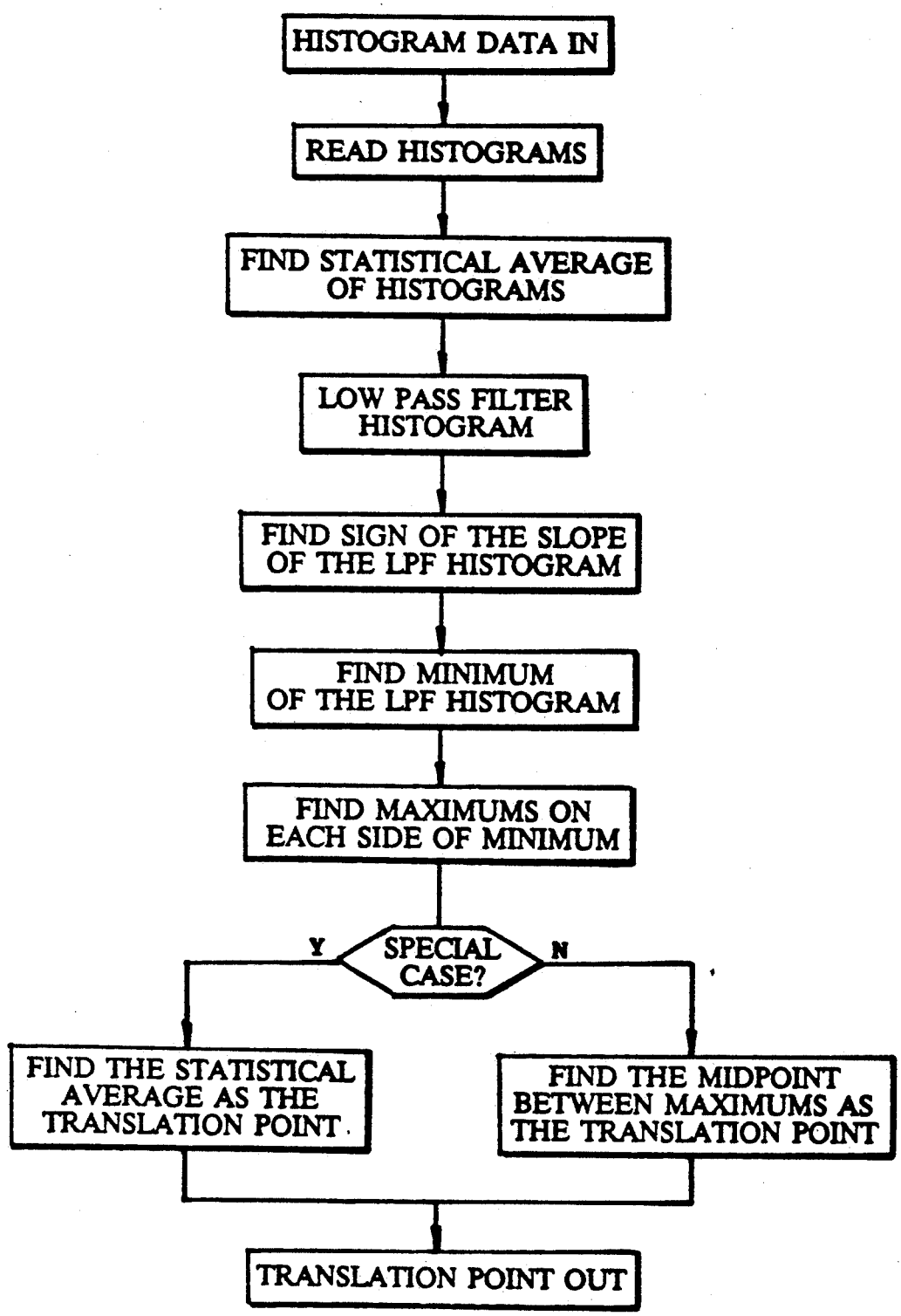
FIG. 3 is a flow chart illustrating the determination of a value midway between two peaks in the histograms of FIGS. 2A, 2B and 2C.

A suitable software algorithm for effecting the determination of the midpoint between peaks is presented in FIG. 3. Histogram data is read into CPU 20, and the statistical average is found for each histogram. The data is low pass filtered to smooth the envelope, and the sign of slope of the smoothed curve is determined.

Now, to determine the true minimum of the histogram, geometric minimum values are determined by looking for slopes which progress from negative sign, through zero, to positive sign. To reduce the risk of false minimums, only those minimums which are within a predetermined distance from the statistical average of the histogram are considered.

Using the geometric minimum thus determined as the dividing point, the geometric maximums on either side of the geometric minimum are determined by looking for slopes which progress from positive sign, through zero, to negative sign.

Assuming that there is a geometric maximum on each side of the geometric minimum, one of the maximums is considered to be foreground and the other maximum is considered to be background. The midpoint about which the histogram is to be translated is determined half way between the two geometric maximums.

In the special case that there exists a geometric maximum on one side of the geometric minimum but not on the other, the translation point is found as the statistical average of the histogram.

Referring back to FIG. 1, the translation points are inputted to a histogram translator 22, which is preferably hardware that will perform a histogram translation of the three plane image data in real time as the data is later extracted from memory 12 and sent to a writer. The translation algorithm which is preferably embodied in hardware performs the computation:

$$x' = 2X_{mid} - x \qquad (1)$$

where x is the color data value (0 through 255 in an 8-bit system) of a particular pixel, $x_{mid}$ is the color data value at the determined transition point, and $x'$ is the color data value assigned to that pixel after translation.

Figure 4A:
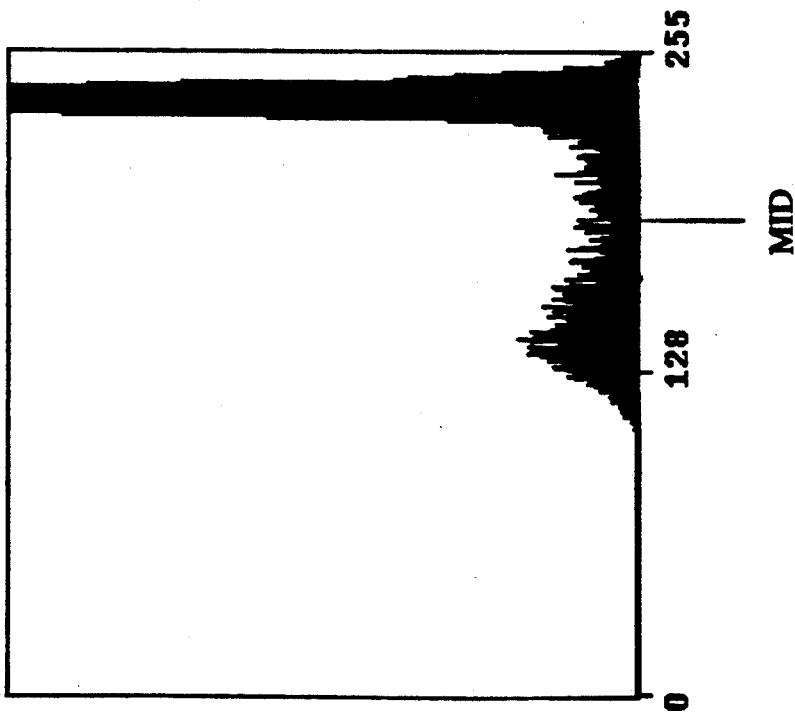
FIGS. 4A, 4B, and 4C are illustrations of histograms of tristimulus-value color planes of an image after image sense reversal in accordance with the present invention.
Figure 4B:
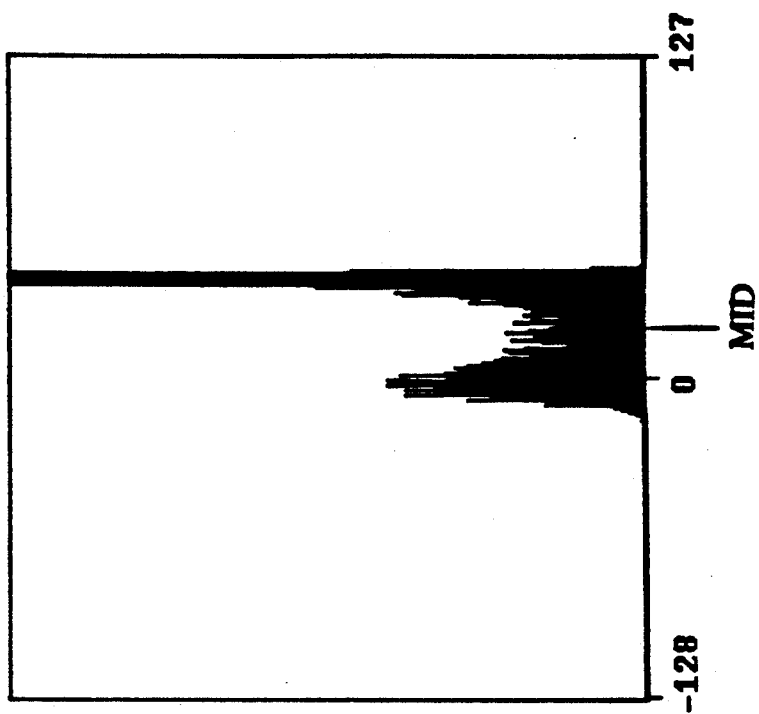
Figure 4C:
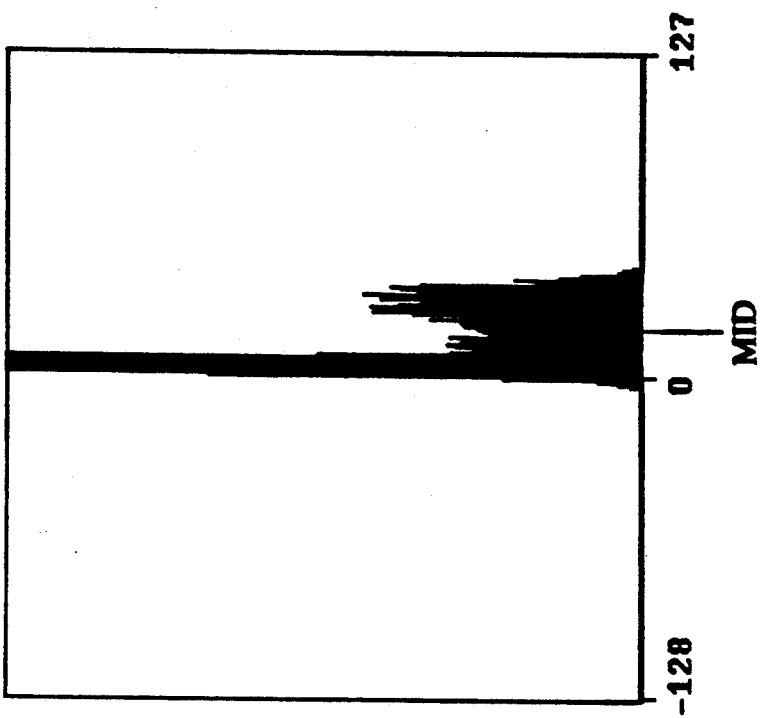

If the image data were resampled after translation, plots of the histograms of the three color planes would look like FIGS. 4A, 4B, and 4C.

Figure 5:
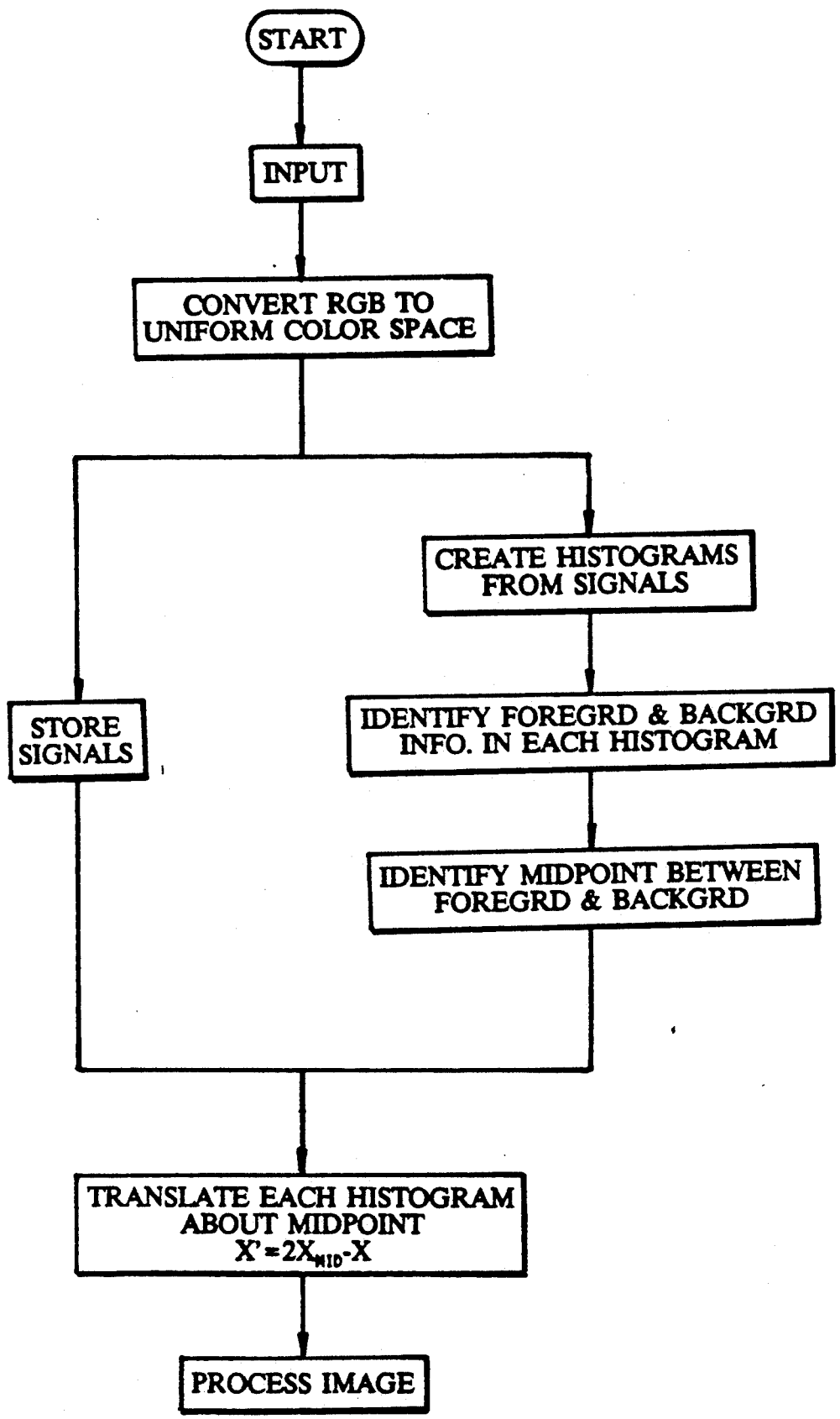
FIG. 5 is a flow chart illustrating the implementation of a preferred embodiment of the present invention.

FIG. 5 summarizes the process. When a color image signal is received, it may be converted to a uniform color space if desired. The tristimulus-value color plane image data for each pixel is stored and histograms are generated of each color plane. The background and foreground values are identified by finding peaks in the histogram data in each color plane.

The values of the two peaks in the histograms are found as shown in FIG. 3, and the value midway between the peaks for each of the three histograms is calculated. Next, the image data is extracted from memory 12 and sent to the writer, with a histogram translation being performed about each plane's foreground and background midpoint by executing equation 1.

The invention has been described in detail with particular reference to preferred embodiments thereof, but it will be understood that variations and modifications can be effected within the spirit and scope of the invention.

What is claimed is:

1. Apparatus for replicating a two-color original image with foreground and background colors exchanged, said apparatus comprising:

an image source for generating a signal representing the color information of each successive pixel of a two-color original image, said signal being separated into a plurality of tristimulus-value color planes represented in a three dimensional color coordinate system such that the planes of the received signal specify the color of pixels of the original image in a color space that describes the gamut of color, each color plane having a characteristic color data distribution;

a histogram generator which produces a histogram of the color data distribution of each color plane of a two-color original image;

a semiconductor storage device for storing the histograms;

means for determining a translation point within each histogram; and means for translating the three color plane image data about the translation point.

2. Apparatus as defined in claim 1 wherein said translating means comprises:

memory for storing the received signal during histogram generation and translation point determination; and means for performing the computation $x' = 2x_{mid} - x$ on the stored signal, where x is the color data value of a particular pixel, $x_{mid}$ is the color data value at the determined transition point, and $x'$ is the color data value assigned to that pixel after translation.

3. The apparatus as set forth in claim 1 wherein said means for determining a translation point includes means for selecting the approximate midpoint between the foreground information and the background information in each histogram as the translation point.

4. The apparatus as set forth in claim 1 wherein said means for determining a translation point includes means for selecting the statistical average of each histogram as the translation point.

* * * * *